United States Patent [19]
Van Lerberghe

[11] Patent Number: 6,120,935
[45] Date of Patent: Sep. 19, 2000

[54] FLAT ACCUMULATOR DEVICE HAVING AN ELECTROCHEMICAL CELL AND ELECTRICAL CONTACTS

[75] Inventor: Steven Van Lerberghe, Le Mans, France

[73] Assignee: U.S. Philips Corporation, New York, N.Y.

[21] Appl. No.: 09/024,636

[22] Filed: Feb. 17, 1998

[30] Foreign Application Priority Data

Feb. 18, 1997 [FR] France ..................... 97 01884

[51] Int. Cl.[7] .............. H01M 6/12; H01M 2/06; H01M 2/26; H01M 2/30
[52] U.S. Cl. .................. 429/211; 429/127; 429/162; 429/178; 429/179
[58] Field of Search .................. 429/161, 162, 429/178, 179, 7, 127, 211

[56] References Cited

U.S. PATENT DOCUMENTS

| | | | |
|---|---|---|---|
| 3,607,401 | 9/1971 | Halpert . | |
| 4,092,464 | 5/1978 | Dey et al. | 429/127 |
| 4,996,128 | 2/1991 | Aldecoa et al. | 429/153 |
| 5,326,652 | 7/1994 | Lake | 429/127 |
| 5,419,982 | 5/1995 | Tura et al. | 429/162 |
| 5,558,957 | 9/1996 | Datta et al. | 429/127 |
| 5,948,562 | 9/1999 | Fulcher et al. | 429/162 |

FOREIGN PATENT DOCUMENTS

| | | |
|---|---|---|
| 0390557A2 | 10/1990 | European Pat. Off. . |
| 55-124950A | 9/1980 | Japan . |
| 59-189554A | 10/1984 | Japan . |
| 63-174265A | 7/1988 | Japan . |

*Primary Examiner*—Maria Nuzzolillo
*Assistant Examiner*—Tracy Dove
*Attorney, Agent, or Firm*—Dicran Halajian

[57] ABSTRACT

A flat and thin accumulator device (10) includes a planar electrochemical cell (100) with at least two laminar electrodes (16, 18) having opposite polarities, arranged on either one of the two sides of an electrolyte material (12, 13), a moisture-proof envelope (51, 52, 53) having two foils (70A, 70B) which form substantially plane faces of a moisture-proof and electrically insulating material. The faces are interconnected in a peripheral sealing area (81A, 81B, 81C, 81D) and electrical contacts (26, 28) of the electrodes form electrode terminals which extend through the peripheral sealing area. The envelope further includes tabs forming extensions of the electrode terminals which have electrical contact areas with the electrode terminals, the tabs and the contact areas longitudinally extending in a sealed manner through the peripheral sealing area, and openings are made transversely through the peripheral sealing area which correspond to the tabs so as to uncover the two opposite faces of the tabs.

14 Claims, 3 Drawing Sheets

FLAT ACCUMULATOR DEVICE HAVING AN ELECTROCHEMICAL CELL AND ELECTRICAL CONTACTS

BACKGROUND OF THE INVENTION

The invention relates to a flat and thin accumulator device including a planar electrochemical cell with at least two laminar electrodes having opposite polarities, which electrodes are disposed on either one of the two sides of an electrolyte material, a moisture-proof envelope having two plane faces of a moisture-proof and electrically insulating material which faces are connected to each other in an airtight manner in a peripheral sealing area, and electrical contact means of the electrodes forming electrode terminals which run through said peripheral sealing area.

The invention finds its application in the manufacturing of electric batteries or rechargeable batteries applied to portable apparatus such as telephone terminals.

A flat accumulator device is already known from European patent published under no. EP 0 390 557 (inventor AUSTIN). This document describes a flat accumulator comprising a planar electrochemical cell, having at least two electrode plates having opposite polarities, an electrolyte-impregnated interposed material and electrode terminals connected to the electrode plates. The planar electrochemical cell is disposed between two foils of a flexible and moisture-proof insulating material, which are heat-sealed, in a sealing area around their periphery, so as to form an envelope enclosing said planar electrochemical cell. The electrode terminals run through the sealing area. These electrode terminals are tabs soldered to the electrode plates and the soldering area is situated inside the planar envelope and is enclosed in the electrolyte. In one of the embodiments of the accumulator, the upper foil of the planar envelope may have openings corresponding to the electrode terminals so as to allow of making contact with these electrode terminals from the exterior through these upper openings. Said openings occur in the peripheral sealing area of the upper and lower foils of the envelope.

SUMMARY OF THE INVENTION

A technical problem linked with electrochemical cells is that inside the envelope surrounding said cell it is impossible to make an assembly of metallic parts of different metals, soldered or mated and enveloped in the electrolyte. Depending on the metals, such an assembly causes chemical reactions to occur which may be strong or simply destroy the electrochemical cell. If the assembly between the electrode terminals and the electrode plates is made inside the envelope, the metals are to be identical or compatible, which reduces the choice of the eligible metals for forming the electrode terminals, whereas a condition of good electrical contact with these electrode terminals is that their material is mechanically resistant, substantially inoxidizable and has low electrical resistance. These qualities are generally not the qualities of materials which are compatible with the laminar electrodes of the flat accumulators.

Another technical problem linked with the flat accumulators is that, even if the material of the electrode terminals is mechanically resistant and has all the other desired qualities defined above, these electrode terminals are none the less thin plates (tabs) with which it is substantially difficult to make direct contact with the exterior.

These problems are solved by means of a device of the type described in the opening paragraph in which the envelope has tabs forming extensions of the electrode terminals which have electrical contact areas with said electrode terminals, said tabs and said contact areas extending longitudinally in an airtight manner through the peripheral sealing area, and further has openings made transversely through said peripheral sealing area, which openings correspond to said tabs so as to uncover the two opposite faces of said tabs.

BRIEF DESCRIPTION OF THE DRAWINGS

These and other aspects of the invention will be apparent from and elucidated with reference to the embodiments described hereinafter.

In the drawings:

FIGS. 6 represent another embodiment for a variant of a series or parallel combination of various electrochemical cells, among which:

DESCRIPTION OF THE PREFERRED EMBODIMENTS

The invention relates to a flat and thin accumulator device including a planar electrochemical cell. This electrochemical cell comprises at least two laminar electrodes having opposite polarities disposed on either one of the two parts of a porous imbibed electrolyte material. This cell is enclosed in a moisture-proof envelope having two plane faces formed by substantially flexible foils of a moisture-proof and electrically insulating material, at least on their faces opposite the electrochemical cell. The foils forming the envelope are connected to the periphery of the electrochemical cell in a sealed manner. The electrochemical cell has electrode terminals which extend through the connecting area of the foils of the envelope in a sealed manner.

Figure 1:
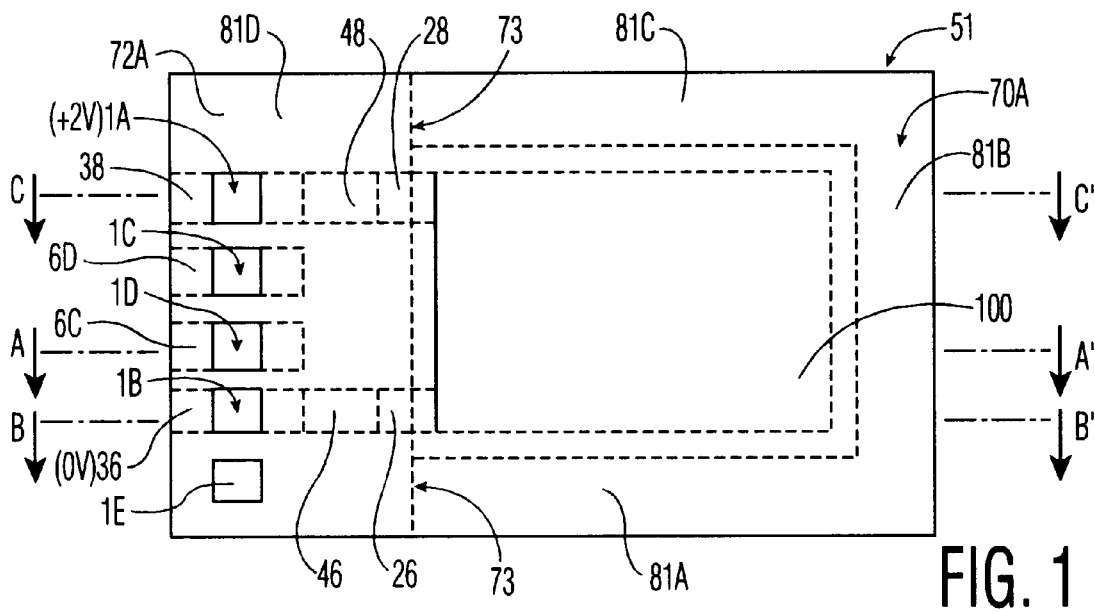
FIG. 1 represents a moisture-proof envelope with an electrochemical cell seen from above.
Figure 2A:
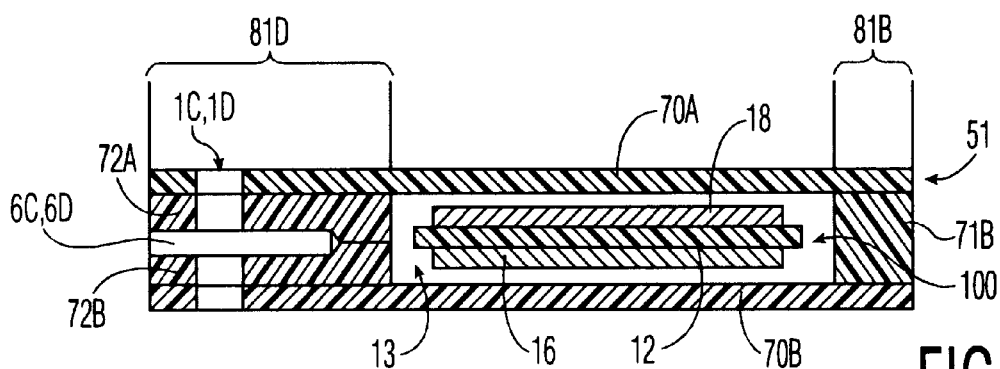
FIG. 2A represents said envelope in a cross-sectional view along axis AA' of FIG. 1.
Figure 2B:
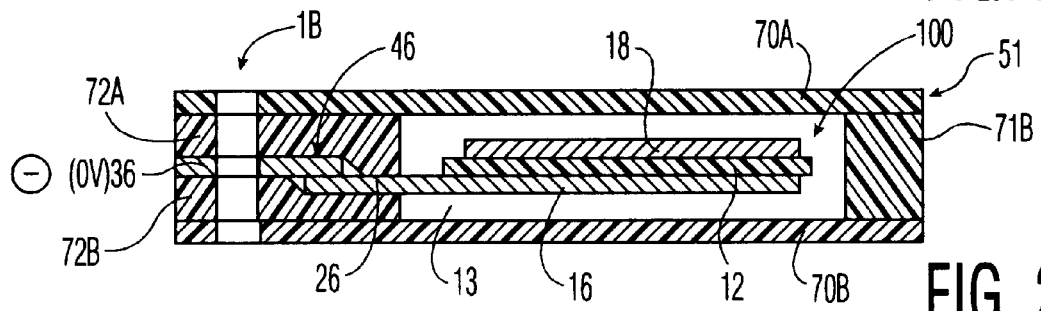
FIG. 2B represents said envelope in a cross-sectional view along axis BB' of FIG. 1.
Figure 2C:
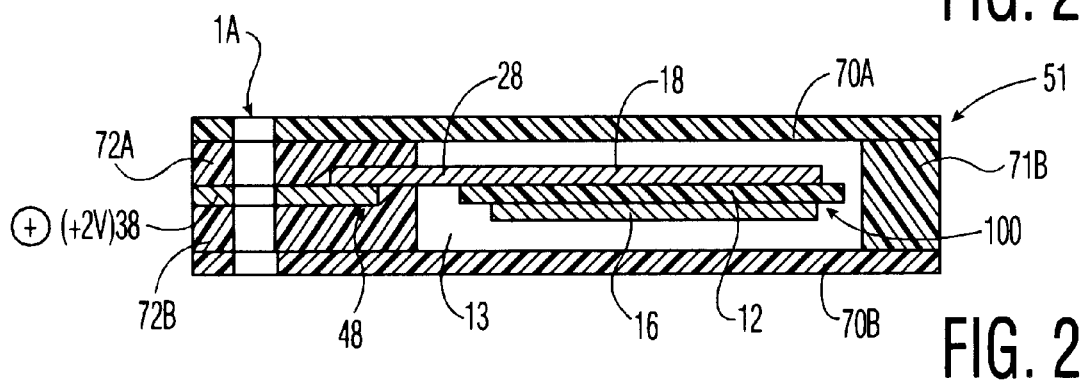
FIG. 2C represents said envelope in a cross-sectional view along axis CC' of FIG. 1.

Thus, with reference to FIG. 1, seen from above and with reference to FIGS. 2A to 2C in a cross-sectional view, the flat accumulator comprises a planar electrochemical cell 100 enclosed in a moisture-proof manner in an envelope 51. The planar electrochemical cell 100 comprises at least two laminar electrodes 16 and 18 of different polarities disposed on either one of the two sides of a layer 12 made of a porous electrolyte-impregnated separating material 13. The separating material extends to beyond the laminar electrodes to avoid short-circuits. Each electrode 16, 18 is lengthened by an electrode terminal 26, 28 respectively. Preferably, as in FIG. 1, the planar electrochemical cell is rectangular. The envelope 51 comprises a first and a second foil 70A and 70B respectively, of a flexible and totally moisture-proof and electrically insulating material. These foils 70A, 70B enclose the planar electrochemical cell 100 in parallel with the laminar electrodes 18, 16. The envelope 51 further includes a frame part of which is shown as numeral 71 in FIG. 3, where the frame is disposed along the periphery of the envelope of the planar electrochemical cell 100. Preferably, the frame comprises a part 71 which extends over three of the sides of the envelope of the planar electrochemical cell 100 at three contiguous positions, where one position is shown in FIGS. 2A–2C as reference 71B, disposed between the foils 70A, 70B as represented in FIG. 1. The frame is preferably of a less flexible material than the foils. On the fourth side of the envelope of the planar electrochemical cell, the frame comprises a part preferably formed by two portions 72A, 72B superposed and disposed between the foils 70A, 70B and interconnected, and connected to the portions upper and lower frame portions. In an airtight manner, for example, by a soldering 73. Due to this soldering, the dimension of the envelope of the electrochemical cell and the dimensions of the portions 71A and 71C and of the foils 70A, 70B may be changed, without changing the portions 72A, 72B. The frame portions which include portion 71 are hermetically sealed to the foils 70A, 70B along the periphery in the sealing areas 81A, 81B, 81C and 81D. The electrode terminals 28, 26 extend through the moisture-proof sealing of the superposed frame portions 72A, 72B. The electrode terminals are generally not suitable for supplying power directly to the contact areas to use the accumulator, because the tabs are too thin and made of a material called first mechanically low-resistant material.

To overcome this drawback, the electrode terminals 26, 28 are given extensions 36, 38 formed by metallic tabs made of a second, more suitable, material, preferably a low-oxidizable and well-conductive metal, and are made with a thickness that is sufficient to be mechanically resistant. These extensions 36, 38 of the electrode terminals are electrically connected to the electrode terminals 26, 28, for example, by soldering 46, 48, respectively. The soldering areas 46, 48 are cut off in an airtight fashion in the sealing area of the superposed frame portions 72A, 72B in the peripheral sealing area 81D of the foils 70A, 70B. This arrangement provides the advantage that the soldering areas 46, 48 are not enveloped in the electrolyte 13 and thus the materials of the extensions 36, 38 cannot generate chemical reactions with the materials of the electrodes and the electrolyte. The superposed frame portions 72A, 72B and the insulating foils 70A, 70B, which are sealed to either one of the two frame portions 72A, 72B, have openings 1A and 1B which correspond to extending pins of the contact terminals 36, 38. These openings are made right through the portions 70A, 72A, on the one hand, and right through the portions 70B, 72B, on the other hand, so that the two faces of the tabs 36, 38 forming the extensions of the electrodes are uncovered in the openings 1A, 1B. In addition, in the sealing area of the superposed frame portions 72A, 72B, one, two or three or various other openings such as the openings 1A, 1B are made right through the foils and superposed portions 70A, 72A, 72B, 70B. With reference to FIG. 1, the envelope 51 of the planar electrochemical cell 100 also has two additional openings 1C and 1D situated between the openings 1A and 1B. These additional openings may in another possible manner be situated on either one of the two sides, or otherwise near to the openings 1A, 1B in said area of the frame.

With reference to FIG. 1 and FIG. 2A, corresponding to the additional openings 1C and 1D, contact tabs 6C and 6D are firmly pressed in an airtight manner between the frame portions 72A, 72B. Thus, both faces of these metallic tabs 6C, 6D, preferably of the same type as the tabs 36, 38, are uncovered in the openings 1C, 1D. An opening 1E running through the foils and portions 70A, 72A, 72B and 70B may not correspond to a metallic tab, but contain an electronic element there such as an electronic microcircuit or electronic microcircuit elements. In a variant, said opening 1E may not be made through and through. This opening may, on the other hand, permit of the passage of an air pipe for evacuating an occasional overpressure which would appear in the electrochemical cell.

FIG. 2B shows in a cross-sectional view the envelope 51, the planarelectrochemical cell 100, the electrode terminal 26, the soldering 46, the metallic tab 36 forming the extension of the electrode terminal 26 and the opening 1B which corresponds to said tab 36. For example, the tab 36 may be the tab that corresponds to the electrically negative electrode, and for example, to 0 volts.

FIG. 2C shows in a cross-sectional view the envelope 51, the planar electro chemical cell 100, the electrode terminal 28, the soldering 48, the metallic tab 38 forming the extension of the electrode terminal 28 and the opening 1A which corresponds to said tab 38. For example, the tab 38 may be the tab that corresponds to the electrically positive electrode, and for example, to +2 volts or indeed to +6 volts.

Figure 3:
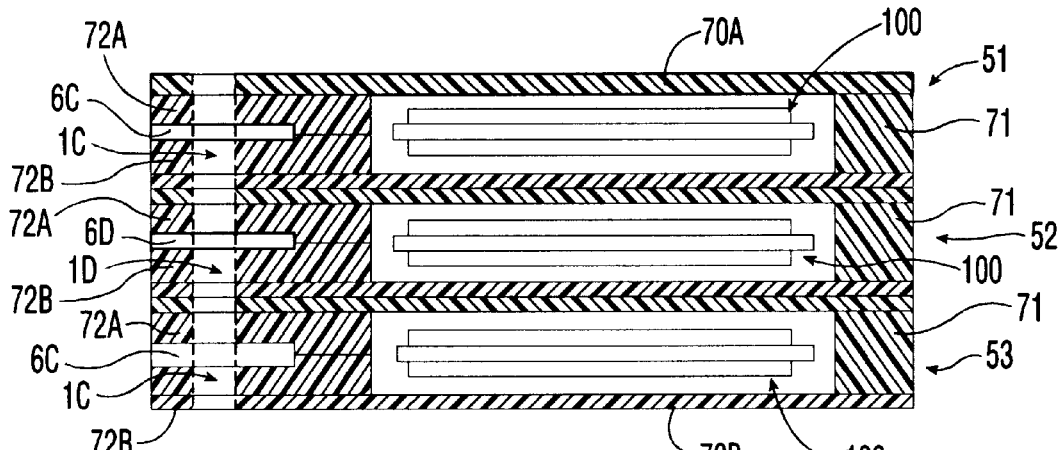
FIG. 3 represents a vertical stacking of three envelopes shown in FIG. 1.

With reference to FIG. 3, an arrangement of various superposed envelopes is realized. FIG. 3 shows an arrangement of three envelopes like 51 of FIGS. 1 and 2, referenced 51, 52, 53. Each of the envelopes 51, 52, 53 contains a planar electrochemical cell and the elements described with reference to FIGS. 1 and 2. The envelopes also have openings at least such as 1A, 1B and preferably such as 1C and 1D, and occasionally 1E, which are situated in identical manner and arranged to correspond in the stacking.

Figure 4:
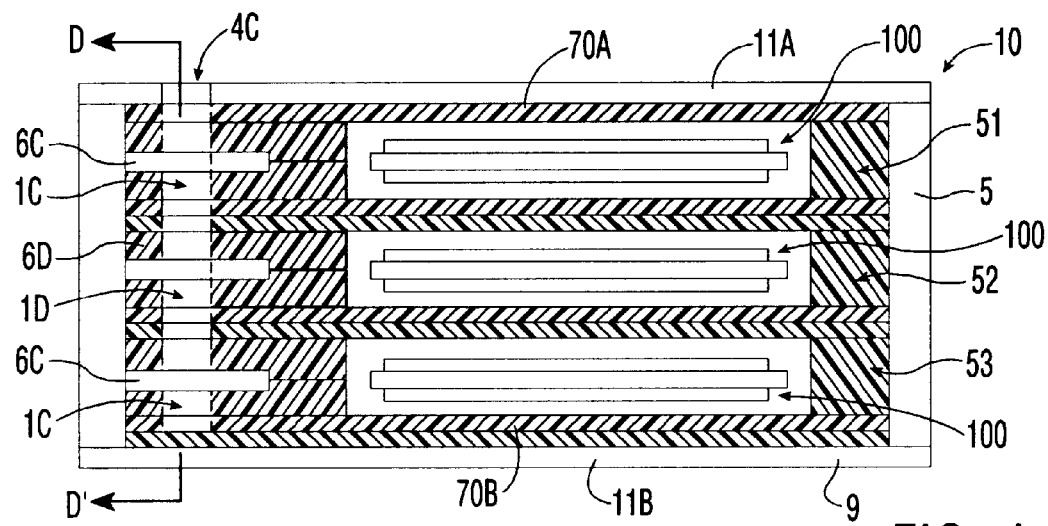
FIG. 4 represents a stacking as shown in FIG. 3 in a housing, forming a flat accumulator.

With reference to FIG. 4, the stacking of the envelopes 51, 52, 53 of FIG. 3 takes place in a housing 10. This housing 10 is formed by a housing body 5 and two plates 11B and 11A. The housing body has the thickness of the arrangement of the envelopes 51, 52, 53. The plates 11B, 11A respectively, forming a base plate of the housing and a cover of the housing, are placed to surround the arrangement of the envelopes 51, 52, and 53 and are fixed to the body 5 of the housing 10. The cover 11A of the housing has openings, one of which is shown in FIG. 4 as reference 4C, that exactly correspond to the openings 1A, 1B, 1C, 1D and 1E of the envelopes 51, 52, 53.

Figure 5:
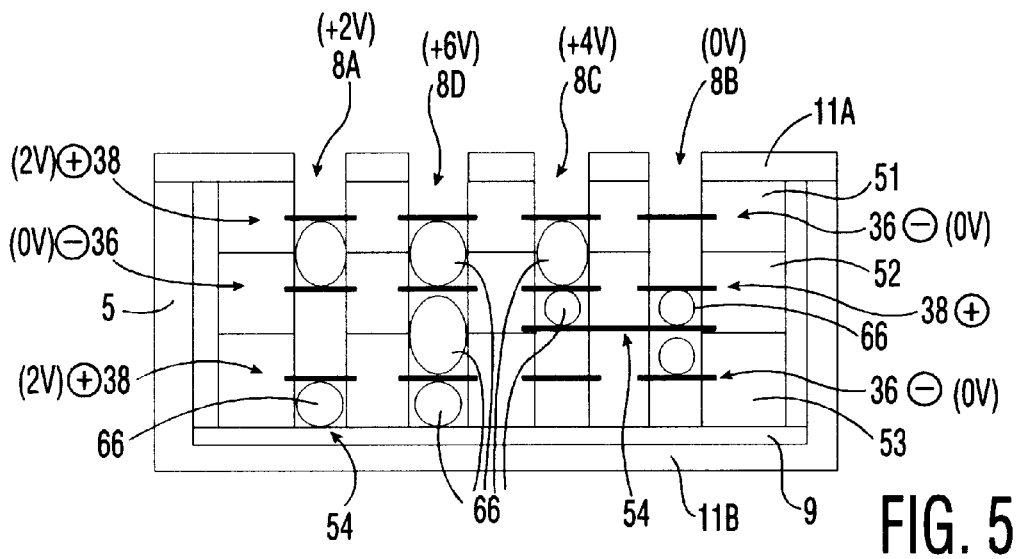
FIG. 5 represents a cross-sectional view of the flat accumulator of FIG. 4 along axis DD'.

In the housing, the electrochemical cells of the envelopes 51, 52, 53 may be combined in parallel or in series. In an embodiment of the arrangement of the stacked envelopes 51, 52, 53, an insulating layer 9 may be disposed on the inside of the base plate 11B of the housing 10. With reference to FIG. 5 a series combination is described. By translating the principle taught with reference to FIG. 5, a person of skill in the art may, on the other hand, without difficulty, realize a parallel combination for another application.

For realizing the arrangement of FIG. 5, three electrochemical cells 0, +2 volts are combined in series. In this arrangement the opening of the housing, superposed on the opening 1A of each of the three envelopes 51, 52, 53, forms an opening 8A which runs up to the insulating layer 9 of the base plate of the housing. In the same way, the openings 8B, 8C, 8D, correspond to the openings having the same reference letter in said envelopes 51 and 53. Depending on whether the electrochemical cells are combined in parallel or in series respectively, the openings of the intermediate envelope 52 correspond as regards the reference numbers to those of the lower and higher envelopes or else they are reversed: for example, the opening 1A of 52 corresponds to the opening 1B of 51 and 53, and the opening 1B of 52 corresponds to the opening 1A of 51 and 53. Between the upper tabs 36, 38 of the envelope 51, in the openings 8B, 8A, the voltage 0, +2 volts is caused to occur. The contact may be made directly with these metallic tabs 36, 38 via a contact tab. In this example, the fact is discarded that the openings of the housing 10 are provided either in the cover or in the base plate. It is considered that the cell 51 is the closest to the openings of the housing and the cell 53 is the most remote from these openings and the closest to the insulating layer 9. By way of non-limiting example, the housing openings in FIG. 5 are provided in the cover 11A. Using the series combination described above, electrical connection bodies 66 are inserted into the openings opposite the envelopes to realize connections between the tabs of the adjacent envelopes, and electrical connection bodies 54 are placed between the tabs of the same envelope to realize their connection so as to combine the electrochemical cells in parallel or in series. Said electrical connection bodies 66 are inserted into said openings opposite each other provided in the envelopes so as to realize connections between the tabs of the adjacent envelopes, and electrical connection bodies 54 are placed between tabs that correspond to the electrodes and insulated tabs of the same envelope to realize their connection, so as to arrange the electrochemical cells in series and produce the various voltage differences between the tabs which are obtained through contact through the corresponding openings (4C and the like) made in the housing and in the peripheral sealing area of the envelopes.

In the embodiment used by way of example with reference to FIG. 5, each envelope has a planar electrochemical cell which produces a first voltage difference (0, +2 volts), and the series combination of these planar electrochemical cells in the envelopes in the housing produces through said openings in the housing a single or various voltage differences among which said first voltage difference, a second, double, voltage difference and a third, threefold, voltage difference. Accordingly, by having contact to the tabs 36, 38 of the cell 51 through the openings 8B, 8A of the housing, a voltage difference of 0, +2 volts may be obtained; by having contact to the tabs 36, 6D of the cell 51 through the openings 8B, 8D of the housing, a voltage difference of 0, +6 volts may be obtained; and by having contact to the tabs 36, 6C of cell 51, through the openings 8B, 8C of the housing, a voltage difference of 0, +4 volts may be obtained.

With reference to FIGS. 6A to 6E, it is not necessary to position an insulating layer 9 at the bottom of the housing 10. In this variant of an embodiment of the invention, the foils 70A, 70B respectively, show cut-outs 75A, 76A and 75B, 76B forming enlarged openings, around the openings 1A, 1D and 1B, 1C provided in the frame portions 72A, 72B. The cut-outs 76A and 76B also cover the openings 1E, for example, situated between the openings 1B and 1C and permit an easy contact to the tabs in said openings. In the example illustrated in FIGS. 6A–6E, 3 envelopes 51, 52, 53 are assembled so that planar electrochemical cells of 0, +2 volts are combined in series and produce a voltage of 0, +6 volts.

Figure 6A:
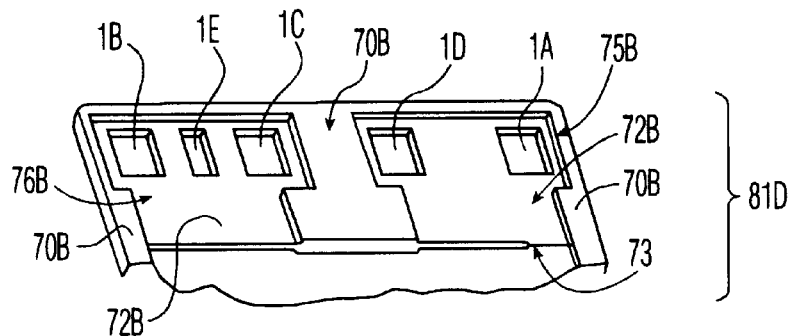
FIG. 6A is a perspective view of the final part of an envelope.
Figure 6B:
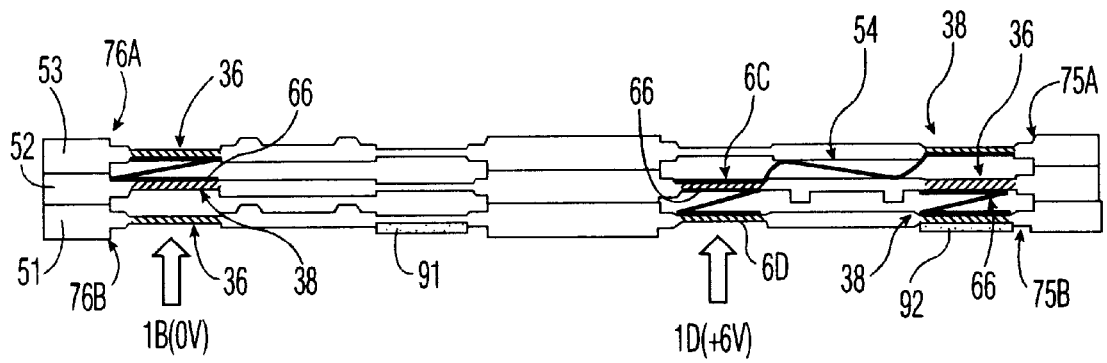
FIG. 6B is a cross-sectional view of the association of 3 envelopes for the series combination of 3 electrochemical cells.

For this purpose, with reference to FIG. 6B, as has already been described with reference to FIG. 5, the contacts 36 which have a negative polarity (0 V) of the envelopes 51 and 53 are disposed on either one of the two sides of the contact 38 which has a positive polarity of +2 volts of the envelope 52, and the openings 1A of the envelopes 51, 52 are aligned with the opening 1B of the interposed envelope 52. In this manner, the contacts 38 having a positive polarity of +2 volts of the envelopes 51 and 53 are disposed on either one of the two sides of the contact 36 which have a negative polarity (0 volts) of the envelope 52, and the openings 1B of the envelopes 51 and 53 are aligned with the opening 1A of the interposed envelope 52. The type-6 contacts, that is to say, not connected to an electrode, are in that case opposite each other in 1D of envelope 51 and 1C of envelope 52.

Figure 6C:
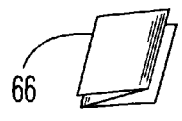
FIGS. 6C and 6D are representations in a perspective view of conductive elastic bodies for establishing the contacts in the series combination of FIG. 6B.

With reference to FIG. 6C, elastic conductor bodies in the form of a Z-shaped plane resilient contacts are placed between the tabs 36 and 38 of the cells 53 and 52, between the type-6 tabs of the openings 1C and 1D of the cells 52 and 51 and between the tabs 36 and 38 of the cells 52 and 51 for establishing the electrical contact.

Figure 6D:
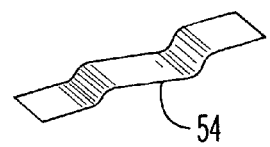

In addition, with reference to FIG. 6D, an elastic conductor body in the form of a tab folded in stages is placed between the type-6 contact of the opening 1C and the envelope 52 and the tab 38 of the envelope 53. Thus, the tab 36 of the envelope 51 has 0 volts and the type-6 tab of the opening 1D of the same envelope 51 has +6 volts. Insulating covers 91 and 92 may be disposed on the other tabs of the envelope 51.

Figure 6E:
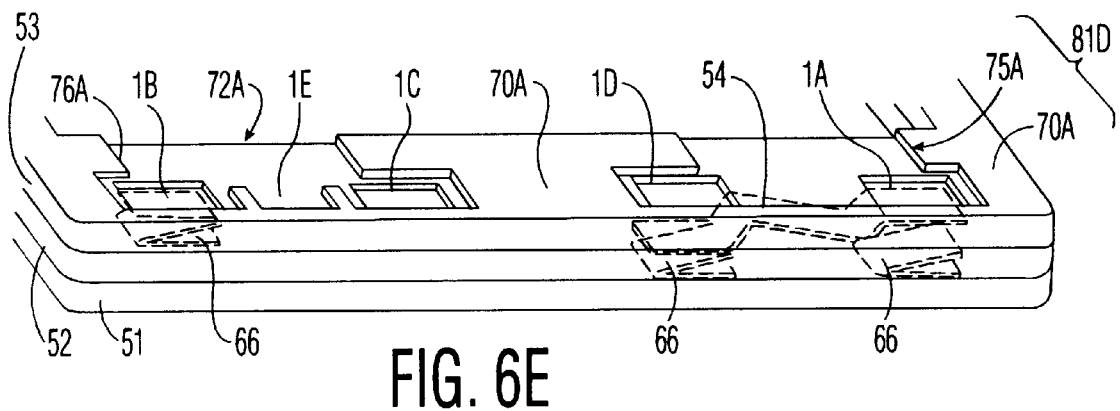
FIG. 6E is a perspective view corresponding to FIG. 6B with a transparent view of the conductive elastic bodies.

The assembly of the envelopes 51, 52, 53 is thus placed in a housing 10 as shown in FIG. 4. FIG. 6E shows the assembly of the envelopes 51, 52, 53 in a perspective view.

What is claimed is:

1. An accumulator device comprising:
   a cell having electrodes and an electrolyte located between said electrodes;
   an envelope having a first section and a second section;
   wherein said first section sealingly contains said cell and allows said electrodes to sealingly extend to said second section to form terminals located in said second section; and
   tabs that are located in said second section, said tabs contacting said terminals in contact areas located in said second section, wherein said second section has openings to uncover a portion of said tabs.

2. The accumulator device of claim 1, wherein said openings are transverse to said cell.

3. The accumulator device of claim 1, wherein said second section has an additional opening for allowing connection of a plurality of said accumulators to provide at least two voltage differences between said tabs.

4. The accumulator device of claim 1, wherein said envelope includes a foils and a frame located between said foils, said foils being soldered to said frame.

5. An accumulator device having a plurality of batteries, each of said batteries comprising:
   a cell having electrodes and an electrolyte located between said electrodes;
   an envelope having a first section and a second section;
   wherein said first section sealingly contains said cell and allows said electrodes to sealingly extend to said second section to form terminals located in said second section; and tabs that are located in said second section, said tabs contacting said terminals in contact areas located in said second section, said second section has openings to uncover a portion of said tabs.

6. The accumulator device of claim 5, wherein said batteries are connected in one of a series connection and a parallel connection.

7. The accumulator device of claim 5, wherein said batteries are connected through respective ones of said terminals to provide a plurality of voltage levels.

8. The accumulator device of claim 5, further comprising connection bodies for insertions in said openings to connect said batteries for providing a plurality of voltage levels.

9. The accumulator device of claim 5, further comprising connection bodies for insertions in said openings to connect said batteries for providing a desired voltage level.

10. The accumulator device of claim 5, further comprising connection bodies for insertions in said openings to connect said batteries in one of a series connection and a parallel connection.

11. The accumulator of claim 1, wherein said contact areas are soldering areas for soldering said tabs to said terminals.

12. The accumulator of claim 1, wherein said envelope has at least three openings.

13. The accumulator device of claim 5, wherein said plurality of batteries are connected to provide at least two voltage differences between said tabs.

14. The accumulator device of claim 13, wherein said envelope has at least three openings to provide said at least to two voltage differences.

* * * * *